Aug. 22, 1933.　　　　J. H. BECKER　　　　1,923,413
PRESSURE INDICATOR
Filed June 10, 1930
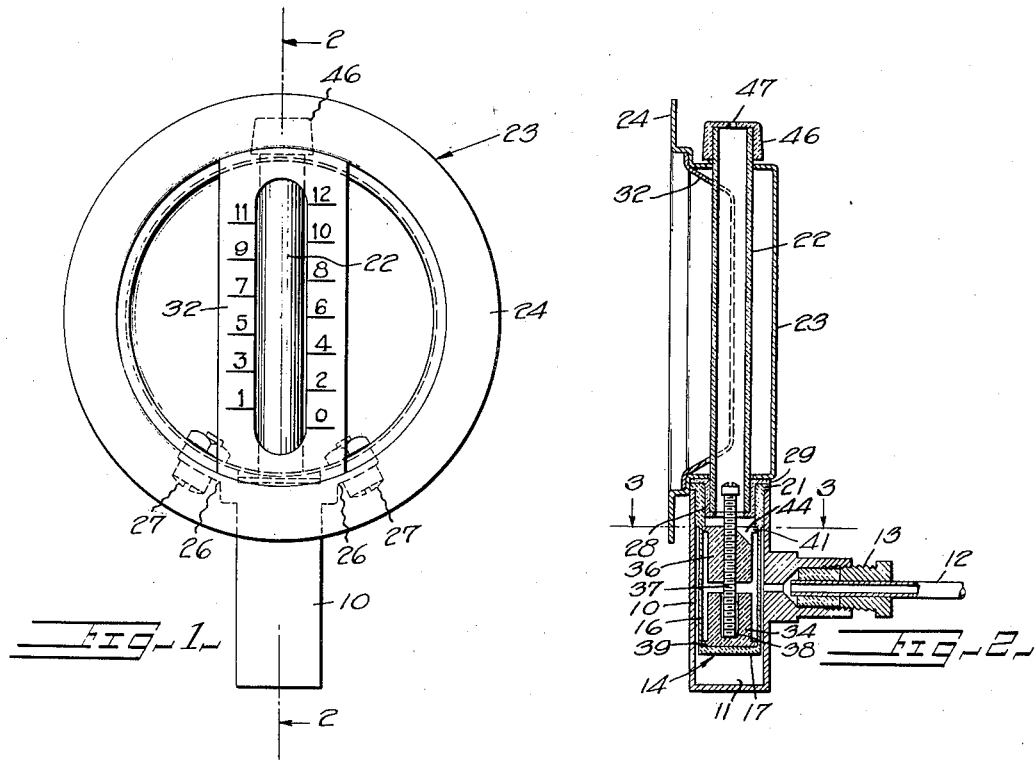
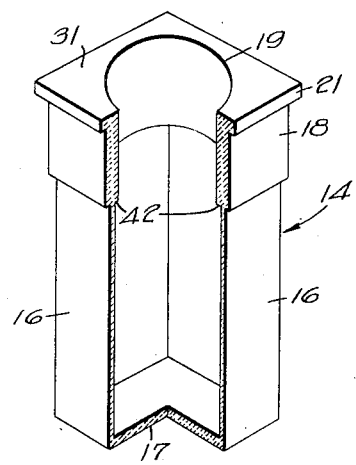
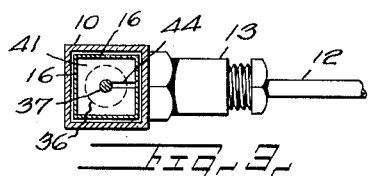
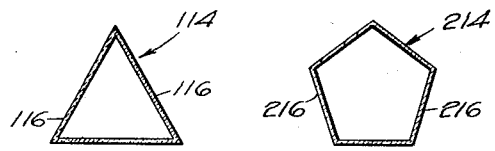
INVENTOR.
JULIUS H. BECKER
BY
White, Prost, Hebert & Lothrop
ATTORNEYS.

Patented Aug. 22, 1933

1,923,413

UNITED STATES PATENT OFFICE 1,923,413

PRESSURE INDICATOR

Julius H. Becker, San Francisco, Calif.

Application June 10, 1930. Serial No. 460,158

6 Claims. (Cl. 73—110)

This invention relates generally to pressure indicators or pressure gauges such as are employed for indicating changes in fluid pressure. Such devices are commonly employed to determine the level of liquid within a tank, as for example as a gasoline gauge for motor vehicles.

It is an object of the present invention to devise a pressure indicator which will be of relatively simple construction, and which will be comparatively cheap to manufacture.

It is a further object of the invention to devise a pressure indicator which can be readily adjusted to accommodate the same to different ranges of fluid pressure variations, to compensate for variations in the dimensions of parts utilized in its assembly, and to accommodate it to varying service conditions.

It is a further object of the invention to devise a pressure indicator of the type utilizing an indicating liquid, in which the liquid is displaced by fluid pressure without the use of a flexible metal diaphragm.

It is a further object of the invention to devise a novel pressure indicator in which the parts can be readily assembled, and which can be readily repaired in case of injury to certain members.

It is another object of the invention to devise a novel article of manufacture which can be used to advantage in pressure indicators or similar devices for displacing a liquid in response to various fluid pressures.

Further objects of the invention will appear from the following description in which the preferred embodiment of the invention has been set forth in detail in conjunction with the accompanying drawing. It is to be understood that the appended claims are to be accorded a range of equivalents consistent with the state of the prior art.

Referring to the drawing:

Figure 1 is a side elevational view illustrating a device incorporating the present invention.

Fig. 2 is a cross sectional detail taken along the line 2—2 of Fig. 1.

Fig. 3 is a cross sectional detail taken along the line 3—3 of Fig. 2.

Fig. 4 is a perspective detail partly in cross section, illustrating the preferred construction of the resilient sack which I preferably utilize in my device.

Figs. 5 and 6 are detail cross sectional views illustrating modified forms of resilient sacks.

The preferred form of the invention as illustrated in the drawing is intended primarily as an automobile gasoline gauge, although it is evident that the device can be used wherever it is desired to indicate fluid pressure variations. It can be described in detail as comprising a member 10 which is made of suitable relatively rigid material such as metal, and which is hollow so as to form a fluid chamber 11. Various fluid pressures are applied to chamber 11 thru tube 12, which is shown connected to member 10 by means of a suitable fitting 13. In utilizing the device as a gasoline gauge the pressure transmitting fluid in chamber 11 and in tube 12 is air, and the remote end of tube 12 is connected to a suitable displacement device positioned at the bottom of the gasoline tank. Therefore for different levels of liquid in the gasoline tank different corresponding fluid pressures will be transmitted to chamber 11.

Positioned within the chamber 11, I provide a member 14 which is hollow, and which is preferably in the form of a sack as shown in Fig. 4. This sack is made of resilient material, such as soft vulcanized rubber, and it is also preferably noncircular in cross section, and as is apparent in Figs. 3 and 4. In the preferred embodiment illustrated it is substantially square in cross section so as to form relatively pliable or flexible side walls 16. The bottom or end wall 17 is preferably of relatively heavier construction than the side wall 16, as shown in Fig. 4, and can be formed integral with the remainder of the sack and of the same resilient material. The upper end portion 18 of the sack is likewise preferably of relatively heavier construction, and is provided with an opening 19 extending into the interior of the sack for a purpose which will be presently explained. It is evident that this entire sack can, and is preferably in practice, molded as a single integral piece of resilient vulcanized rubber.

The resilient sack 14 as described above is normally operatively disposed within the chamber 11 as shown in Figs. 2 and 3, and in practice member 10 is shaped similarly to the sack. Thus in this instance member 10 is substantially square in cross section as shown in Fig. 3. Enlarged end portion 18 fits snugly within the upper end of member 10, and an integral resilient lip or flange 21 overlaps the upper end of member 10. When so disposed it will be noted that resilient side walls 16 are retained in spaced relationship with the adjacent side walls of member 10, so that fluid pressure introduced thru tube 12 will be subjected to the outer surfaces of each of the resilient walls 16, to flex these walls inwardly.

It is apparent from the above that chamber 11 together with tube 12 forms means for impressing various fluid pressures upon the flexible walls of the resilient sack 14. In combination with such means I utilize suitable indicating means responsive to a change in the volumetric capacity of the interior of resilient sack. This indicating means is preferably in the form of a tube 22 made of suitable transparent material such as glass, pyroxylin, or a phenolic condensate product Normally this tube 22 is mounted in conjunction with a cup-shaped casing 23, the forward face of this casing being provided with a suitable flange 24 for attachment to an instrument board. In order to form a convenient structural unit member 10 is shown provided with laterally extending lugs 26, these lugs being clamped to the lower side of casing 23 by suitable means such as bolts 27. The upper end of tube 22 extends thru the upper side of casing 28 while the lower end extends into the enlarged end portion 18 of resilient sack 14. In order to provide a fluid tight fit, a bushing or sleeve 28 can be fitted between the lower end of tube 22 and the inner walls of opening 19, and this bushing or sleeve is also preferably made of resilient material such as soft vulcanized rubber. A resilient integral flange 29 is formed upon the upper edge of sleeve 28, and this flange is normally interposed between the upper face 31 of the resilient sack 14, and the adjacent surface of casing 23. When assembled, the resilient lip 21 and the resilient flange 29 are in compressed condition in order to form a sealed engagement between the upper end of the resilient sack and the hollow member 10.

When in use the interior of resilient sack 14 contains a suitable indicating liquid which does not have a deleterious effect upon the resilient material of the sack, as for example ethylene glycol. Assuming that the pressure within chamber 11 corresponds to empty condition of the gasoline tank, sufficient liquid is introduced into sack 14 and into the lower portion of tube 22, to bring the liquid level to approximately zero indicating position. Upon increasing the fluid pressure in chamber 11, it is apparent that the resilient walls 16 will be flexed inwardly to decrease the volumetric capacity of sack 14, and to thus displace a certain amount of the indicating liquid upwardly into tube 22. A suitable graduated member 32 or scale can be mounted in convenient proximity to tube 22, to enable an operator to visually determine or gauge the level of liquid.

The means which I utilize for effecting compensating adjustments preferably operates by placing an adjustable tension upon the resilient side walls 16. Thus as shown in Fig. 2 a pair of opposed plugs 34 and 36 are disposed within sack 14, these plugs being made of suitable material which can remain in contact with the soft rubber of the sack 14 without deleterious effect, as for example hard rubber. Screw 37 is threaded thru plug 36, and the lower end of this screw is seated within a hole 38 formed centrally of plug 34. A squared flange 39 upon the lower end of plug 34 seats upon the end wall 17 of sack 14, and serves to retain the remainder of the plug normally out of contact with the resilient side walls 16. The upper end of plug 36 is similarly provided with a squared flange portion 41 which normally abuts shoulder 42 on resilient sack 14. (Fig. 4.) It is apparent that by turning screw 36, —which can be conveniently accomplished by inserting a suitable tool thru tube 22 to engage the head of this screw,—the distance between plugs 34 and 36 can be adjusted, and correspondingly different degrees of tension can be placed upon the resilient side walls 16. In order to permit flow of liquid between tube 22 and the interior of the resilient sack 14, a suitable opening is provided in screw plug 36, as for example a slot 44 as shown in Figs. 2 and 3. The upper end of indicating tube 22 is preferably open to the atmosphere, but can be normally covered by a cap 46 made of suitable material such as resilient vulcanized rubber. This cap is shown provided with a small aperture 47.

Assuming that a fluid pressure is in chamber 11 which is greater than atmospheric plus the pressure of the column of indicating liquid, resilient side walls 16 will be equally flexed inwardly to cause the indicating liquid within tube 22 to assume a definite level, which serves as an indication of the fluid pressure within chamber 11. If the fluid pressure in chamber 11 increases by a certain amount walls 16 are flexed inwardly to a greater degree to correspondingly reduce the volumetric capacity of sack 14, and thus displace a greater amount of indicating liquid to cause the liquid in tube 22 to assume a correspondingly higher level. If the fluid pressure in chamber 11 should become abnormally excessive beyond the range of pressures which it is desired to indicate, the device will not be injured as flexible walls 16 will merely be pressed inwardly into contact with plugs 34 and 36. Similarly if the pressure in chamber 11 is reduced to an abnormal degree, say below atmospheric, sack 14 will not be injured because flexible walls 16 will merely be flexed outwardly into contact with the adjacent side walls of hollow member 10.

If upon installing the apparatus, for example as a gasoline gauge, it is desired to adjust the apparatus to secure an accurate indication for a gasoline tank at a given depth, this can be accomplished by adjusting the position of screw 37 and by adjusting the quantity of indicating liquid. Screw 37 can also be adjusted to compensate for inaccuracies in the dimensions of certain parts, as for example the diameter of tube 22 or the size of sack 14, and such compensating adjustments can also be made to suit varying service conditions. Variations in temperature will have little effect upon the device because of the relatively small volume of indicating liquid employed.

It will be noted that the device is characterized by a minimum number of working parts which are of extreme simplicity, thus making possible quantity production at relatively low cost. Furthermore the device can be readily serviced by the replacement of certain parts, as for example by replacing the resilient sack 14, in the event that this part becomes injured or in the event that the material of the sack deteriorates.

It is of course evident that various modifications can be made within the spirit of the present invention. For example in place of utilizing resilient sacks which are square in cross section, I can utilize a resilient sack 114 which is substantially triangular in cross section as shown in Fig. 5. In this case the resilient side walls 116 are at an angle of less than 90 degrees with respect to each other. As shown in Fig. 6 it is also possible to utilize a resilient sack 214 which has more than four resilient side walls 216. In this case the side walls are arranged at angles greater than 90 degrees with respect to each other. Other modifications of the resilient sack will suggest themselves, it being the object to have a sack which forms resilient walls, which when flexed inwardly upon being subjected to external fluid pressure, vary the volumetric capacity of the sack. While I have utilized a sack which is circular in cross section, such a sack is not as desirable as one having walls which are normally substantially planar, as the flexing is not uniform upon all sides due to the convex curvature presented to the fluid pressure.

I claim:

1. In a pressure indicator, a hollow sack formed to provide a plurality of normally substantially planar resilient side walls, means for impressing different fluid pressures upon said resilient side walls, a liquid within the sack, and a tube having one end thereof communicating with the sack.

2. In a pressure indicator, a sack made of resilient material formed to provide a plurality of normally substantially planar resilient side walls, an indicating tube having its one end communicating with the interior of the sack, an indicating liquid disposed within the sack and within a portion of the tube adjacent thereto, and means for impressing various fluid pressures upon the flexible side walls of said sack.

3. In a pressure indicator, a sack made of resilient material, means for impressing different fluid pressures upon the side walls of the sack, adjustable means for tensioning the side walls of the sack, a tube communicating with the sack, and a liquid disposed within the sack and said tube.

4. In a pressure indicator, a sack made of resilient material, means for impressing different fluid pressures upon the side walls of the sack, and indicating liquid disposed within the sack, an indicating tube communicating with the interior of the sack, and means disposed within the sack and accessible thru said tube for adjustably tensioning the side walls of the sack.

5. In a pressure indicator, a hollow sack made of resilient rubber and likewise formed to provide a plurality of normally substantially planar resilient side walls, means for impressing different fluid pressures upon said resilient side walls, a liquid within the sack, and a tube having one end thereof communicating with the sack.

6. In a pressure indicator, a sack made of resilient material and formed to provide a plurality of substantially planar resilient side walls, means for impressing different fluid pressures upon the side walls of the sack, adjustable means for tensioning the side walls of the sack, a tube communicating with the sack, and a liquid disposed within the sack and said tube.

JULIUS H. BECKER.